United States Patent [19]
Koyama

[11] Patent Number: 5,909,307
[45] Date of Patent: Jun. 1, 1999

[54] OPTICAL SYSTEM FOR INFRARED CAMERA

[75] Inventor: Motoo Koyama, Tokyo, Japan

[73] Assignee: Nikon Corporation, Tokyo, Japan

[21] Appl. No.: 08/969,259

[22] Filed: Nov. 13, 1997

[51] Int. Cl.⁶ .................................................. G02B 13/14
[52] U.S. Cl. .......................... 359/356; 359/781; 359/747
[58] Field of Search ................................. 359/350, 353, 359/355, 356, 357, 747, 781, 761

[56] References Cited

U.S. PATENT DOCUMENTS

| | | | |
|---|---|---|---|
| 4,738,518 | 4/1988 | Hilbert et al. | 359/356 |
| 4,781,449 | 11/1988 | Hirakawa et al. | 359/781 |

FOREIGN PATENT DOCUMENTS

7-72385  7/1995  Japan .

Primary Examiner—Cassandra Spyrou
Assistant Examiner—Jared Treas
Attorney, Agent, or Firm—Michael N. Meller

[57] ABSTRACT

An optical system for use in an infrared camera which includes, in order from an object side: a first lens group having a negative refractive power and a second lens group having a positive refractive power arranged a distance from the first lens group. The first lens group comprises a negative meniscus lens having a convex surface facing toward the object side and the second lens group comprising, in order from the object side: a first lens having a positive refractive power, a second lens having a negative refractive power and a third lens having a positive refractive power. The lenses comply with the following conditions: (1) $0.5\Phi < -\Phi f < 0.7\Phi$, (2) $0.55\Phi < \Phi r < 0.87\Phi$, (3) $1.55 (1/\Phi) < d < 1.98 (1/\Phi)$ and (4) $dr < 2.1 (1/\Phi)$. The conditions are defined by: $\Phi$: is the overall refractive power for the overall optical system for the infrared camera, $\Phi f$: is the refractive power for the first lens group, $\Phi r$: is the refractive power for the second lens group, d: is the distance between principal points of the first and second lens groups and dr: is the lens separation between the most objectwise lens surface and the most imagewise lens surface in the second lens group. The first and second lens groups are made up of lenses which contain silicon or germanium.

12 Claims, 6 Drawing Sheets

OPTICAL SYSTEM FOR INFRARED CAMERA

FIELD OF THE INVENTION

The present invention relates to an imaging optical system in a infrared camera with a 2-dimension (hereafter referred to as 2-D) solid state image sensor and the like which is used for, processing infrared radiation in an infrared camera. It specifically relates to an imaging optical system used as an infrared radiation lens within a range of about 3 to 5 $\mu$m.

BACKGROUND OF THE INVENTION

In an infrared radiation lens of conventional technology, infrared radiation from the real image formed by an objective lens is collimated by a collimator lens. Behind the collimator lens is a scanning mirror (e.g. polygon mirror) and an imaging lens which forms an image with the radiation from the scanning mirror.

Recently, however, along with the advancement of semiconductor processing technology, a 2-D solid state image sensor for infrared radiation, in which solid state sensors are two dimensionally arranged, has been commonly manufactured. The infrared camera with a 2-D solid state image sensor has eliminated a collimator lens or a scanning mirror. This structure of the optical system is effective in reducing the size and weight of the camera.

Generally, in a 2-D solid state imaging sensor for infrared radiation, the sensor itself is cooled, to eliminate any thermal noise. The field view of the sensor is limited by a cold shield (a stop cooled to a low temperature). The cold shield is given an aperture diameter and a length, which is defined basically by the brightness of the optical system. Note that the cold shield must have a certain length, which enables the optical system to reduce the impact from thermal emission from the lens barrel in order to balance the temperature of the optical system.

When the size of the sensor is determined, if one wants to obtain a wide view through the field, the focal length of the optical system must be short. When one intends to use an optical system with a 2-D solid state image sensor for infrared radiation which has a short focal length, one will find that the back focus is so small that the cooled shield and the objective lens interfere with each other. Such a system is not acceptable for users in the art.

SUMMARY OF THE INVENTION

The present invention intends to provide an optical system for infrared radiation which has a back focus of a sufficient length to form a cold shield. It also intends to provide an optical system for infrared radiation with a wide observation field of view whose aberration is corrected excellently throughout the system and which has a back focus large enough to form a cold shield.

An optical system for use in an infrared camera, wherein said camera comprises, in order from an object side:

a first lens group having a negative refractive power with the first lens group comprising a negative meniscus lens having a convex surface facing the object side;

a second lens group having a positive refractive power arranged at a distance from the first lens group with said second lens group comprising, in order from the object side:

a first lens having a positive refractive power;
a second lens having a negative refractive power; and
a third lens having a positive refractive power; wherein the following conditions are fulfilled:

$$0.5\Phi < -\Phi f < 0.7\Phi \qquad (1);$$

$$0.55\Phi < \Phi r < 0.87\Phi \qquad (2);$$

$$1.55\ (1/\Phi) < d < 1.98\ (1/\Phi) \qquad (3);$$

and $$dr < 2.1\ (1/\Phi) \qquad (4);$$

wherein:

$\Phi$: is the overall refractive power for the overall optical system for the infrared camera;
$\Phi f$: is the refractive power for the first lens group;
$\Phi r$: is the refractive power for the second lens group;
d: is the distance between principal points of the first and second lens groups; and
dr: is the lens separation between the most objectwise lens surface and the most imagewise lens surface in the second lens group.

A second optical system for use in an infrared camera, which forms an image of an object, comprising:

a first lens group having a negative refractive power with the first lens group comprising a negative meniscus lens having a convex surface facing the object side;

a second lens group having a positive refractive power which is arranged between said first lens group and an image plane with said second lens group comprises, in order from the object side:

a first sub-lens group having a positive refractive power;
a second sub-lens group having a negative refractive power; and
a third sub-lens group having a positive refractive power; wherein the following conditions are fulfilled:

$$0.5\Phi < -\Phi f < 0.7\Phi \qquad (1);$$

$$0.55\Phi < \Phi r < 0.87\Phi \qquad (2);$$

$$1.55\ (1/\Phi) < d < 1.98\ (1/\Phi) \qquad (3);$$

and $$dr < 2.1\ (1/\Phi) \qquad (4);$$

$\Phi$: is the overall refractive power for the overall optical system for infrared radiation;
$\Phi f$: is the refractive power for the first lens group;
$\Phi r$: is the refractive power for the second lens group;
d: is the distance between principal points of the first and second lens groups; and
dr: is the lens separation between the most objectwise lens surface and the most imagewise lens surface in the second lens group.

The invention also contemplates that the first and the second lens groups comprise three lenses made of an element from the group consisting of silicon, germanium or mixtures thereof.

It is also preferable that, in the present invention, it is preferable that the negative meniscus lens in the first group and the first lens and the third lens in the second group are made of silicon (Si) and the second lens in the second group is made of germanium (Ge).

DETAILED DESCRIPTION OF THE PREFERRED EMBODIMENTS

The optical system of the present invention is a so called "retro focus" type which comprises, in order from the object side:

a first lens group having a negative refractive power and a second lens group having a positive refractive power.

In the optical system of the present invention, the negative refractive power of the first lens group attracts the principal point of a lens towards the image plane with respect to the optical system. The negative refractive power substantially increases the length of a back focus. The range for the refractive power of the first lens group is defined by condition (1), viz., $0.5\Phi<-\Phi f<0.7\Phi$. If $-\Phi f$ is below the lower limit of condition (1), obtaining a desired length for the back focus, which is the major objective of the present invention, will be difficult. Also, in this case, the Petzval Sum (Petzval field curvature) increases, this makes it difficult to obtain a flatter image plane. If $-\Phi f$ is above the upper limit of condition (1), radiation will diverge too much in the first lens group. To balance the refractive power between the second and the first lens groups, the refractive power in the second lens group must be strong enough to provide a desired refractive power for the overall optical system. This condition generates significant spherical and coma aberrations. Specifically, radiation around the off axial light beams is refracted such that it is at a distance which is farther from the optical axis. This radiation enters at a position in the second lens group, where it is far from the optical axis. This results generate coma aberration in difficult correction.

The positive refractive power in the second lens group works as a master lens to condense the light beams which are diverged in the first lens group. The second lens group must have a relatively strong positive refractive power to condense diverged light. Condition (2), viz., $0.55\Phi<\Phi r<0.87\Phi$, defines the range of refractive power in the second lens group. If $\Phi f$ exceeds the upper limit of condition (2), the second lens group, which is constructed with three lenses, will have too much positive refractive power. This group will not be able to suppress spherical aberration measured at the incident height, which is the mid-point of the negative and positive aberrations. The second lens group, under this condition, will degrade the coma aberration levels. On the other hand, if $\Phi r$ is lower than the lower limit of the condition (2), a relatively excellent aberration correction can be obtained. However, it will be difficult to cancel spherical aberration generated in the first lens group, which is negative. This will degrade the overall aberration for the optical system.

Condition (3), viz., $1.55\ (1/\Phi)<d<1.98\ (1/\Phi)$, defines the distance between the principal points between the first and the second lens groups. Now, the distance between the first and the second lens groups is defined as the distance between the rear (secondary) principal point of the first lens group and the front (primary) principal point of the second lens group. If the distance d between the principal points exceeds the upper limit of condition (3), too much negative distortion will be generated in the first lens group due to the intensity of the negative refractive power. In addition, the height at which the radiation enters can be too far from the optical axis, generating too much coma aberration. On the other hand, if the distance d is lower than the lower limit of condition (3), the first lens group must have a negative refractive power which is strong enough to provide a back focus of an appropriate length. To obtain an appropriate refractive power for the overall system, the second lens group must have a strong positive refractive power. In other words, both the first and the second lens groups must have an extremely strong refractive power, generating high order spherical and coma aberrations, which are difficult to correct.

Condition (4), viz., $dr<2.1\ (1/\Phi)$, defines the thickness of the second lens group of the optical system. If the thickness of the second lens group is above the upper limit, it is difficult to obtain an appropriate range of a back focus due to the thickness of the second lens group itself, even if conditions (1), (2), and (3) are fulfilled.

Figure 1:
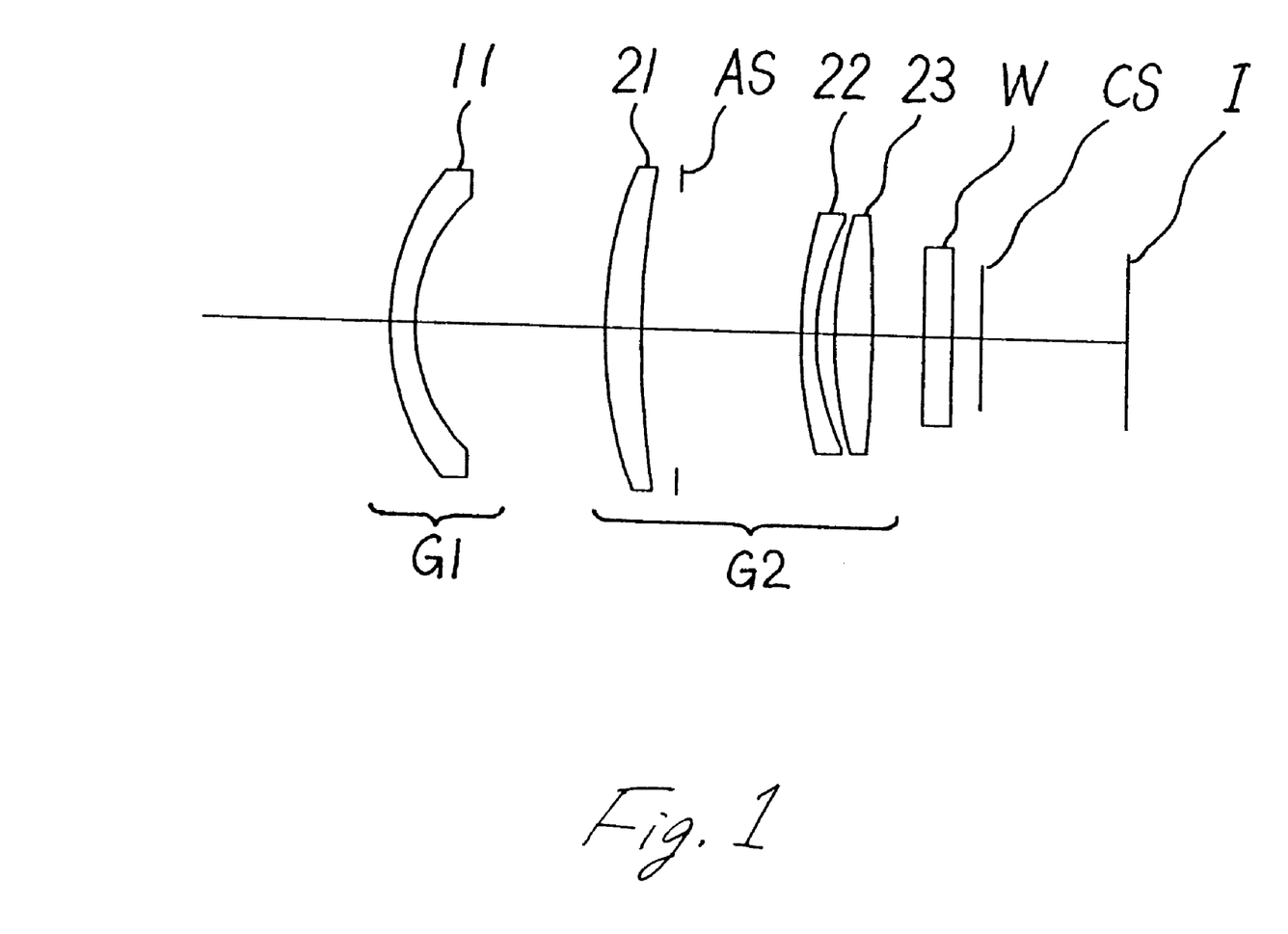
FIG. 1 shows the lens layout of Embodiment 1.
Figure 2:
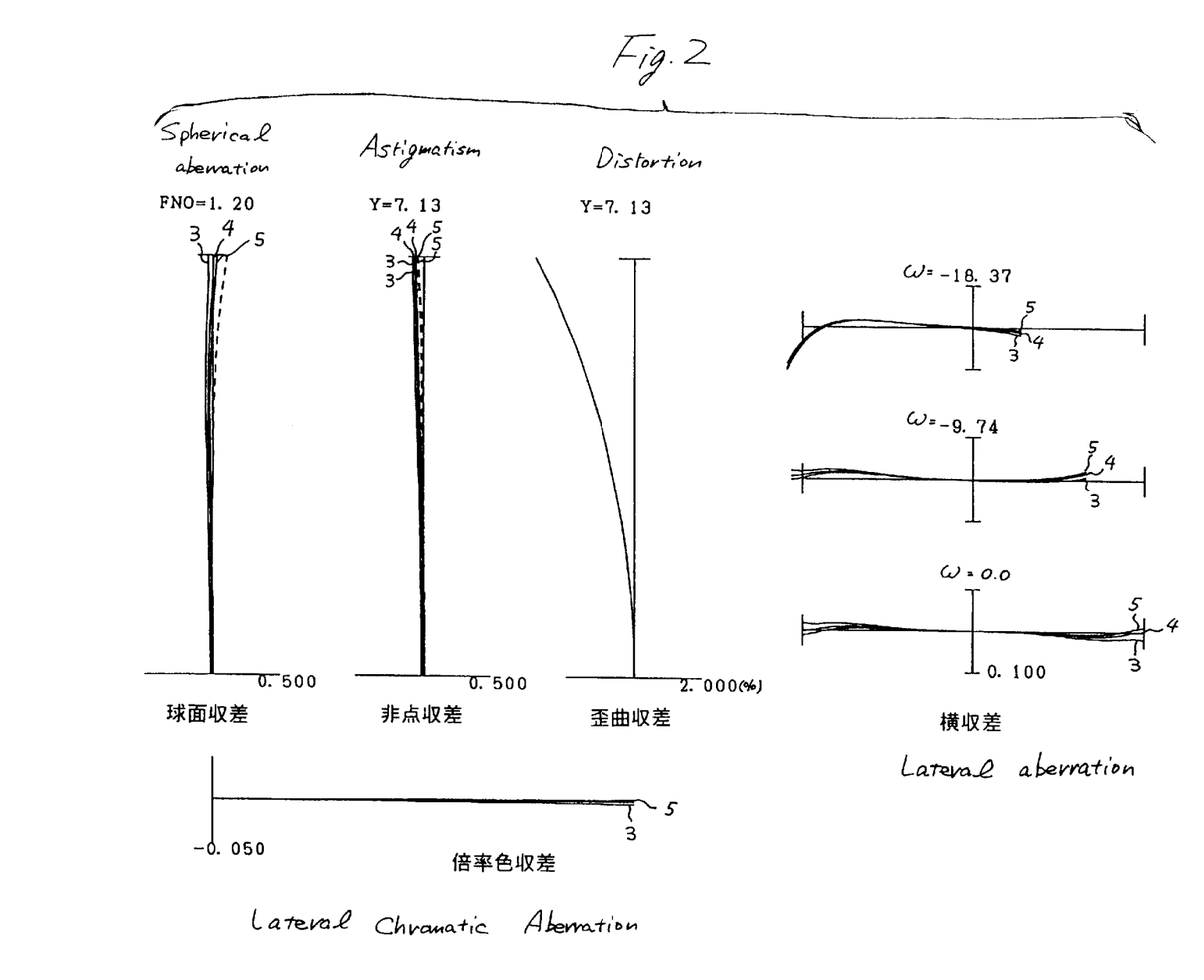
FIG. 2 shows various aberrations obtained from Embodiment 1.
Figure 3:
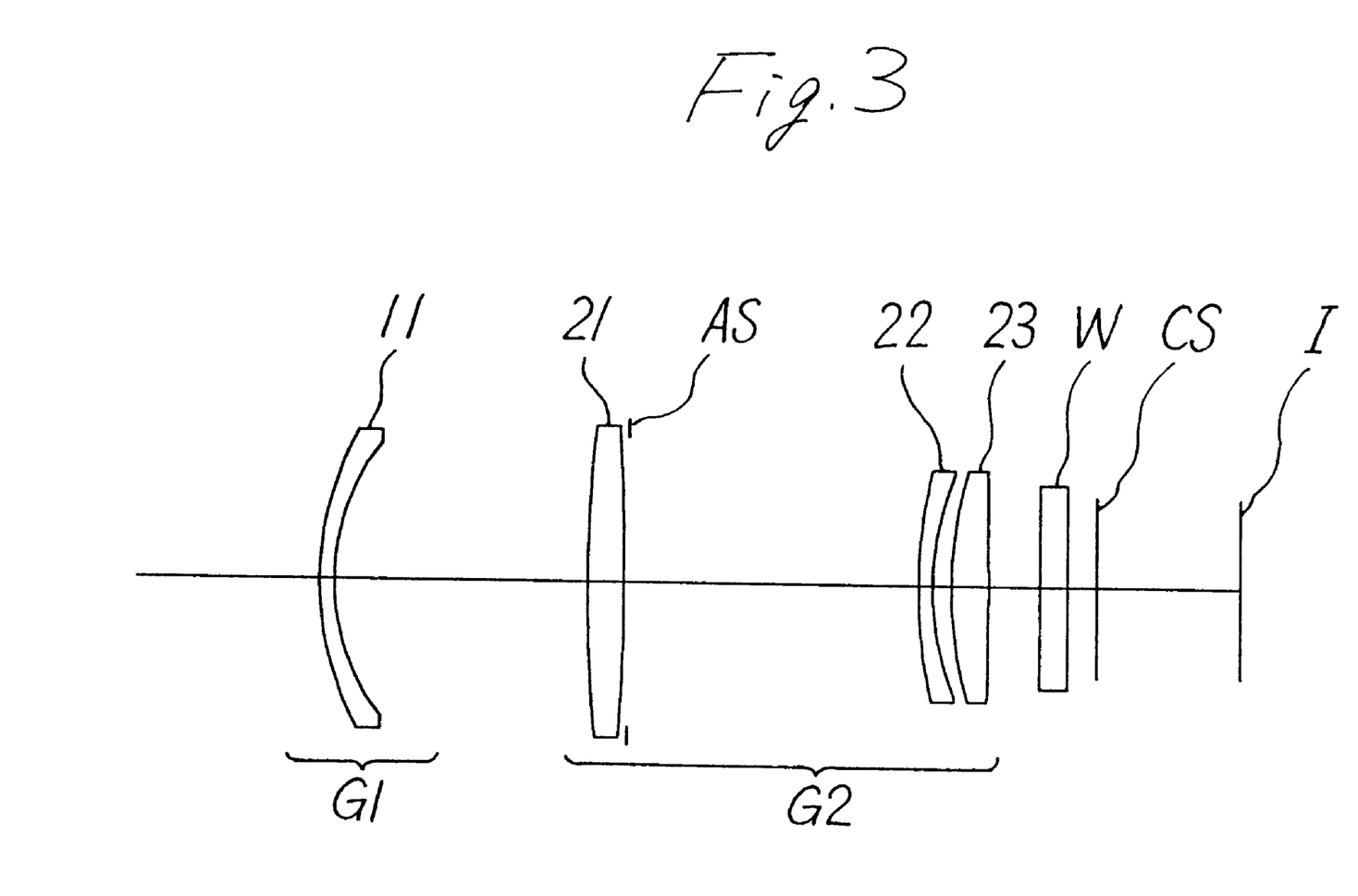
FIG. 3 shows the lens layout of Embodiment 2.
Figure 4:
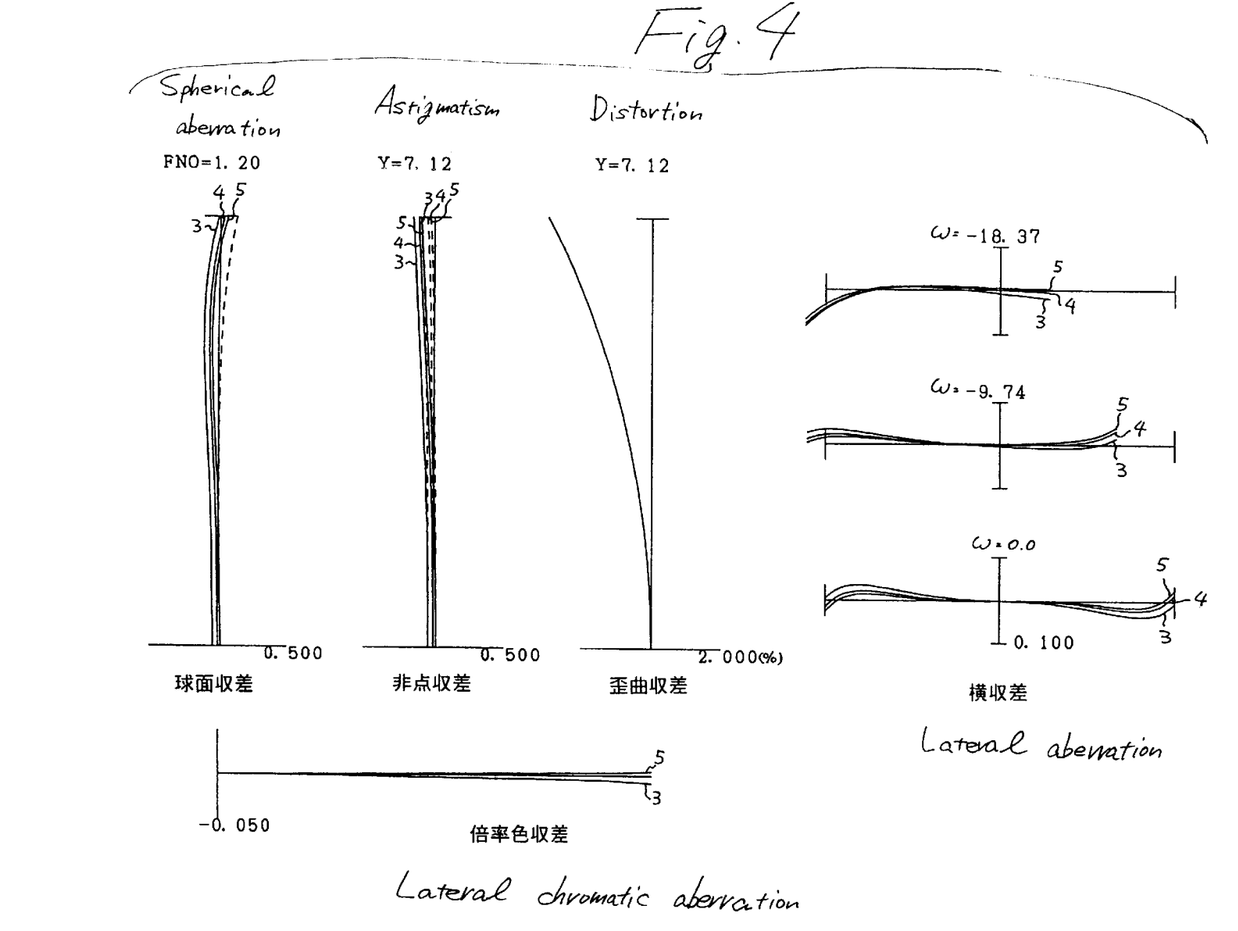
FIG. 4 shows various aberrations obtained from Embodiment 2.
Figure 5:
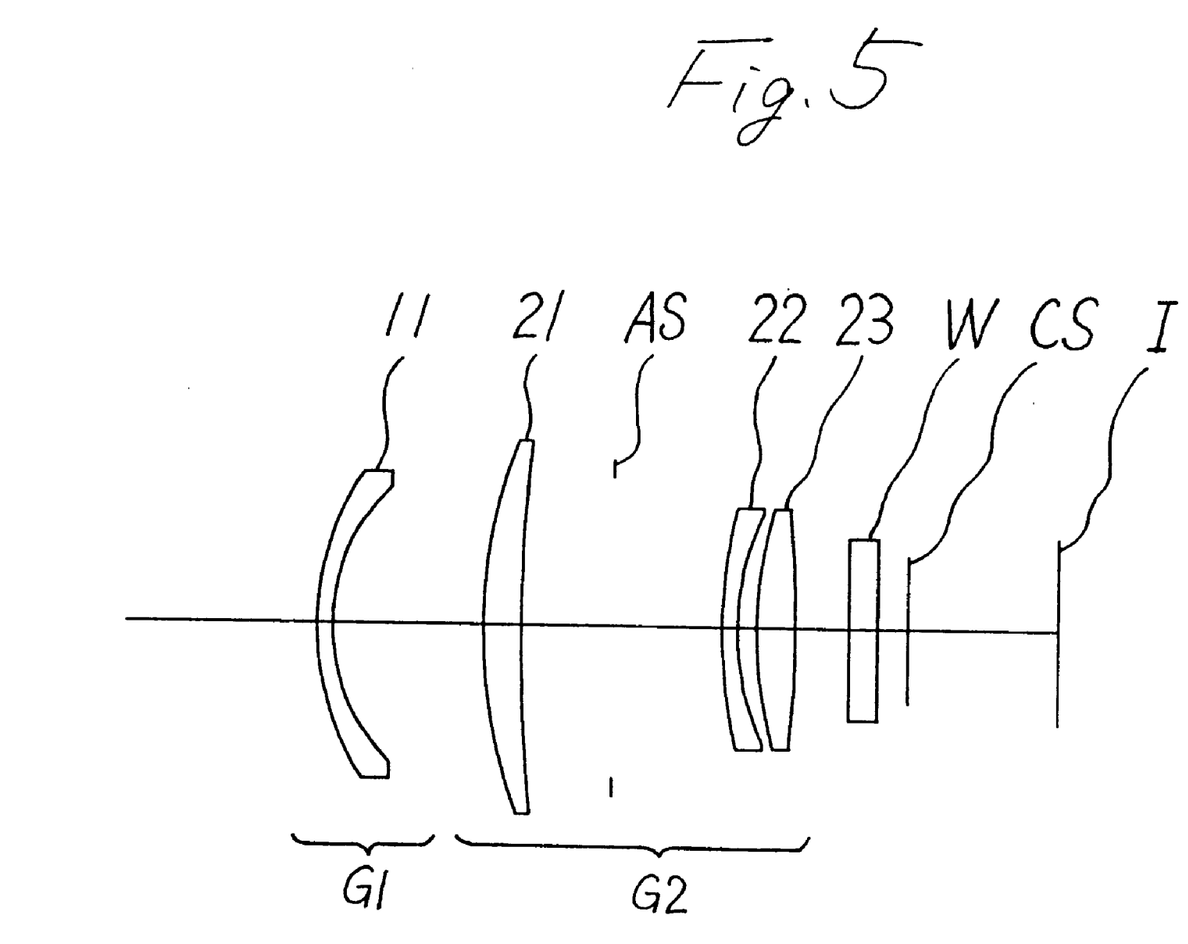
FIG. 5 shows the lens layout of Embodiment 3.
Figure 6:
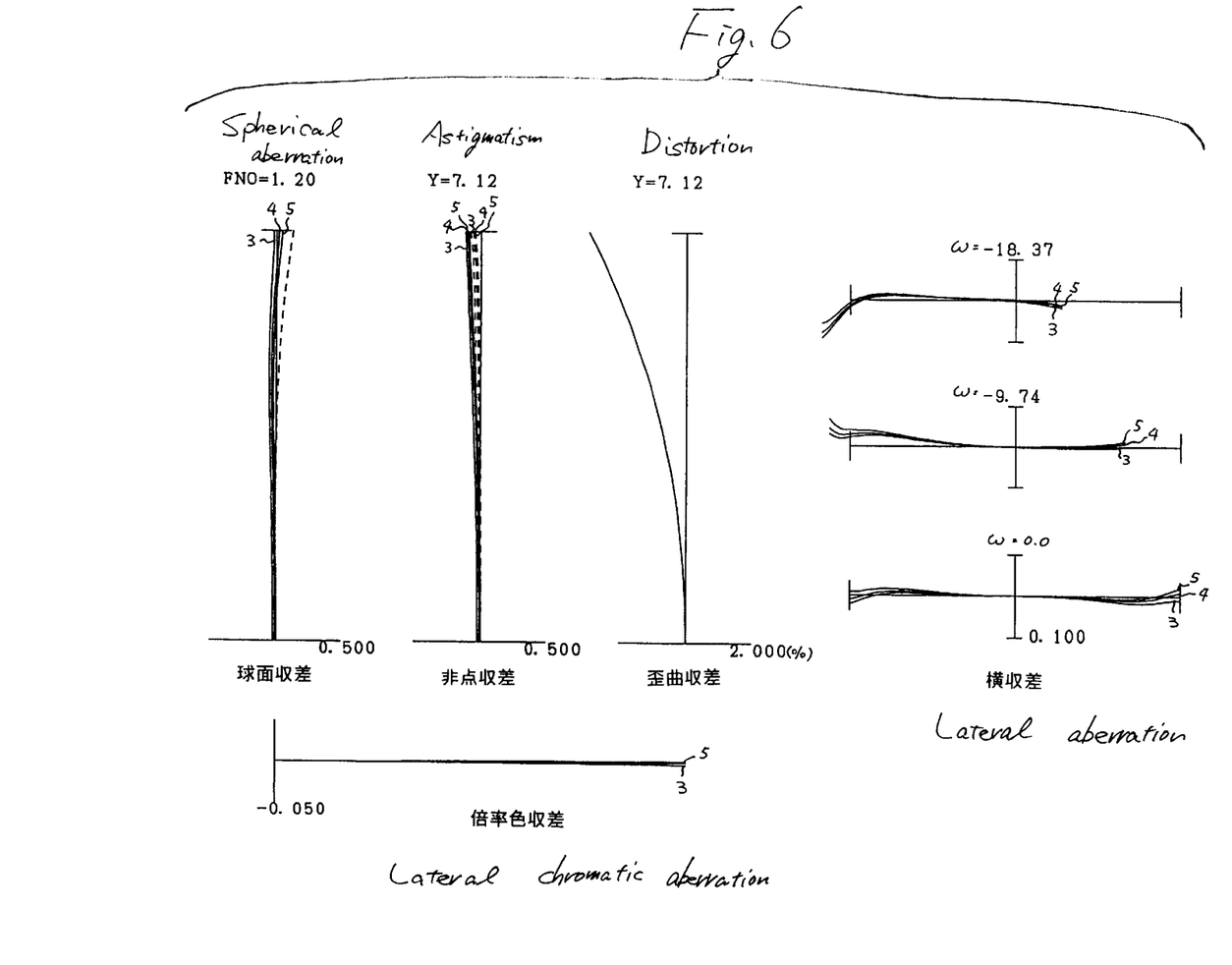
FIG. 6 shows various aberrations obtained from Embodiment 3.

Embodiments of the present invention are described herein after. FIGS. 1, 3, and 5 are the lens layouts of the optical system for infrared radiation of embodiments 1, 2, and 3. FIGS. 2, 4, and 6 are aberration diagrams of embodiments 1, 2, and 3.

The optical system for infrared radiation of embodiment 1 is shown in FIG. 1 which comprises, in order from the object side:

a first lens group G1 having a negative refractive power, and a second lens group G2 having a positive refractive power which is arranged along the optical axis spaced a predetermined distance apart from the first lens group G1.

The first lens group G1 comprises a negative meniscus lens 11 having a convex surface facing toward the object side.

The second lens group G2 comprises, in order from the object side:

a positive meniscus lens 21 having a convex surface facing toward the object side (the first lens having a positive refractive power);

a negative meniscus lens 22 having a convex surface facing toward the object side (the second lens having a positive refractive power); and a positive biconvex lens 23 (the third lens having a positive refractive power).

Also, in the optical system for infrared radiation shown in FIG. 1, aperture stop "AS" is positioned between the first and the second lenses 21 and 22 in the second lens group. In addition, negative meniscus lens 11, of the first lens group G1 and positive first lens 21, and positive third lens 23 of the second lens group G2 are made of Si and negative second lens 22 is made of Ge.

The optical system for infrared radiation of Embodiment 2 shown in FIG. 3 comprises, in order from the object side:

a first lens group G1 having a negative refractive power and a second lens group G2 having a positive refractive power which is arranged on the optical axis spaced a predetermined distance apart from the first lens group G1.

The first lens group G1 comprises a negative meniscus lens 11 having a convex surface facing toward the object side.

The second lens group G2 comprises, in order from the object side:

a positive biconvex lens 21 (the first lens having a positive refractive power);

a negative meniscus lens 22 having a convex surface facing toward the object side (the second lens having a negative refractive power); and a positive biconvex lens 23 (the third lens having a positive refractive power).

In the optical system for infrared radiation of shown in FIG. 3, aperture stop "AS" is positioned between first and second lenses 21 and 22 respectively in the second lens group. In addition, negative meniscus lens 11 of the first lens group G1 and positive first lens 21, and positive third lens 23 of the second lens group G2 are made of Si and the negative second lens 22 is made of Ge.

The optical system for infrared radiation of Embodiment 3, shown in FIG. 5, comprises, in order from the object side:

a first lens group G1 having a negative refractive power and a second lens group G2 having a positive refractive power which is arranged along the optical axis spaced a predetermined distance from the first lens group G1.

The first lens group G1 comprises a negative meniscus lens 11 having a convex surface facing toward the object side.

The second lens group G2 comprises, in order from the object side:

a positive biconvex lens 21 having a convex surface facing toward the object side (the first lens having a positive refractive power);

a negative meniscus lens 22 having a convex surface facing toward the object side (the second lens having a negative refractive power); and a positive biconvex lens 23 (the third lens having a positive refractive power).

Also in the optical system for infrared radiation shown in FIG. 5, aperture stop "AS" is positioned between first and second lenses 21 and 22 respectively in the second lens group. In addition, negative meniscus lens 1 of the first lens group and positive first lens 21, and positive third lens 23 of the second lens group G2 are made of Si and the negative second lens 22 is made of Ge.

FIGS. 1, 3, and 5, also show a detector protection window W, for protecting the 2-D solid state image sensor which is located on the image plane I, and cold shield CS together with the protective window W arranged on the optical axis facing the object side.

Tables 1 through 3 show various lens data of Embodiments 1 through 3 respectively. Table 4 shows the indices of refraction for materials (Si, Ge) used in Embodiments 1 through 3.

Note that in Tables 1 through 3, FNO denotes F number, f denotes focal length of the overall system, $\lambda$ denotes wavelength, $\Phi$ denotes Aperture stop, and $\Phi$ AS and $\Phi$ CS denote aperture stop and cold shield aperture diameter respectively.

TABLE 1

Embodiment 1
FNO = 1.20; focal length: f = 22.1 mm ($\lambda$ = 4 $\mu$m)

| Surface No. | Curvature Radius | Lens Separation | Index of Refraction | | |
|---|---|---|---|---|---|
| 1 | 26.00794 | 2.72650 | 3.428900 | Si | 11 |
| 2 | 18.59025 | 20.40119 | 1.000000 | | |
| 3 | 46.40703 | 3.93443 | 3.428900 | Si | 21 |

TABLE 1-continued

Embodiment 1
FNO = 1.20; focal length: f = 22.1 mm ($\lambda$ = 4 $\mu$m)

| Surface No. | Curvature Radius | Lens Separation | Index of Refraction | | |
|---|---|---|---|---|---|
| 4 | 102.36733 | 4.11960 | 1.000000 | | |
| 5 | ∞ | 13.11475 | 1.000000 | AS: $\phi$ AS = 29.50 mm | |
| 6 | 46.49888 | 1.63934 | 4.025500 | Ge | 22 |
| 7 | 26.31279 | 1.96721 | 1.000000 | | |
| 8 | 42.99842 | 4.09836 | 3.428900 | Si | 23 |
| 9 | −185.53307 | 5.65000 | 1.000000 | | |
| 10 | ∞ | 3.00000 | 3.428900 | Si | W |
| 11 | ∞ | 3.20000 | 1.000000 | | |
| 12 | ∞ | 15.65748 | 1.000000 | CS: $\phi$ CS = 14.32 mm | |

TABLE 2

Embodiment 2
FNO = 1.20; focal length: f = 22.1 mm ($\lambda$ = 4 $\mu$m)

| Surface No. | Curvature Radius | Lens Separation | Index of Refraction | | |
|---|---|---|---|---|---|
| 1 | 33.57416 | 1.63704 | 3.428900 | Si | 11 |
| 2 | 24.65333 | 27.80202 | 1.000000 | | |
| 3 | 171.02140 | 3.92889 | 3.428900 | Si | 21 |
| 4 | −299.99504 | 0.47603 | 1.000000 | | |
| 5 | ∞ | 31.73704 | 1.000000 | AS: $\phi$ AS = 31.76 mm | |
| 6 | 51.01930 | 1.63704 | 4.025500 | Ge | 22 |
| 7 | 32.62054 | 1.96444 | 1.000000 | | |
| 8 | 44.55262 | 4.09259 | 3.428900 | Si | 23 |
| 9 | −771.98456 | 5.61400 | 1.000000 | | |
| 10 | ∞ | 3.00000 | 3.428900 | Si | W |
| 11 | ∞ | 3.20000 | 1.000000 | | |
| 12 | ∞ | 15.65748 | 1.000000 | CS: $\phi$ CS = 14.32 mm | |

TABLE 3

Embodiment 3
FNO = 1.20; focal length: f = 22.1 mm ($\lambda$ = 4 $\mu$m)

| Surface No. | Curvature Radius | Lens Separation | Index of Refraction | | |
|---|---|---|---|---|---|
| 1 | 29.62730 | 1.63704 | 3.428900 | Si | 11 |
| 2 | 20.54536 | 15.74517 | 1.000000 | | |
| 3 | 55.30329 | 3.92889 | 3.428900 | Si | 21 |
| 4 | 183.22619 | 9.59749 | 1.000000 | | |
| 5 | ∞ | 11.45926 | 1.000000 | AS: $\phi$ AS = 31.76 mm | |
| 6 | 53.34184 | 1.63704 | 4.025500 | Ge | 22 |
| 7 | 29.04873 | 1.96444 | 1.000000 | | |
| 8 | 46.74973 | 4.09259 | 3.428900 | Si | 23 |
| 9 | −132.10676 | 5.61424 | 1.000000 | | |
| 10 | ∞ | 3.00000 | 3.428900 | Si | W |
| 11 | ∞ | 3.20000 | 1.000000 | | |
| 12 | ∞ | 15.65747 | 1.000000 | CS: $\phi$ CS = 14.32 mm | |

Note that the index of refraction shown in Tables 1 through 3 is for $\lambda$=4 $\mu$m.

TABLE 4

| | Index of Refraction - Material | | |
|---|---|---|---|
| | n (3) | n (4) | n (5) |
| Si | 3.436000 | 3.428900 | 3.425600 |
| Ge | 4.044600 | 4.025500 | 4.017050 | n(3), n(4), and n(5) in Table 4 denote index of refractions for each of the wavelengths, 3, 4, and 5 μm respectively.

In the diagrams showing various aberrations of Embodiments 1 through 3 shown in FIGS. 2, 4, and 6, FNO denotes F number, Y denotes an image height, Ω denotes a field angle, 3 denotes an aberration profile for 3 μm, 4 denotes an aberration profile for 4 μm, 5 denotes an aberration profile for 5 μm. In a spherical aberration diagram, dotted lines show a sine condition. The dotted line in the astigmatism aberration diagram shows the Meridional image surface, and the solid line shows the Sagittal field surface.

As is apparent from the aberration diagrams shown in FIGS. 2, 4, and 6, the optical system for infrared radiation of Embodiments 1 through 3 provides excellent aberration correction performance throughout the screen to the edges, regardless of the fact that the optical system has a short focal length and a wide viewing field. The optical system can also maintain a back focus which is long enough to form a cold shield.

Particularly when used for infrared radiation of basically 3 to 5 μm, the optical system for infrared radiation according to the above embodiments can provide an optical system for infrared radiation with a wide viewing field and with excellent aberration correction throughout the screen while maintaining a back focal length which is long enough to provide a cold shield. In above embodiments, the aperature stop should not be limited to the position within the second lens group. For example, it is permitted to dispose the aperature stop at object or image side of the second lens group G2.

The invention should not be limited to the above embodiments. It should be clearly evident to one of ordinary skill in the art that the embodiments disclosed herein are merely three aspects of the possible ramifications of the presently disclosed invention.

What is claimed is:

1. An optical system for use in an infrared camera, wherein said camera comprises, in order from an object side:
    a first lens group having a negative refractive power with the first lens group comprising a negative meniscus lens having a convex surface facing the object side;
    a second lens group having a positive refractive power arranged at a distance from the first lens group with said second lens group comprising, in order from the object side:
    a first lens having a positive refractive power;
    a second lens having a negative refractive power; and
    a third lens having a positive refractive power; wherein the following conditions are fulfilled:

$$0.5\Phi < -\Phi f < 0.7\Phi \tag{1};$$
    $$0.55\Phi < \Phi r < 0.87\Phi \tag{2};$$
    $$1.55\ (1/\Phi) < d < 1.98\ (1/\Phi) \tag{3};$$
    and
    $$dr < 2.1\ (1/\Phi) \tag{4};$$

wherein:
Φ: is the overall refractive power for the overall optical system for the infrared camera;
Φf: is the refractive power for the first lens group;
Φr: is the refractive power for the second lens group;
d: is the distance between principal points of the first and second lens groups; and
dr: is the lens separation between the most objectwise lens surface and the most imagewise lens surface in the second lens group.

2. The optical system of claim 1, wherein said negative meniscus lens in said first lens group and said first lens and said third lens in said second lens group are made of silicon.

3. The optical system of claim 1, wherein said second lens in said second lens group is made of germanium.

4. The optical system of claim 1, wherein said second lens group has an aperture stop.

5. An optical system for use in an infrared camera, which forms an image of an object, comprising:
    a first lens group having a negative refractive power with the first lens group comprising a negative meniscus lens having a convex surface facing the object side;
    a second lens group having a positive refractive power which is arranged between said first lens group and an image plane with said second lens group comprises, in order from the object side:
    a first sub-lens group having a positive refractive power;
    a second sub-lens group having a negative refractive power; and
    a third sub-lens group having a positive refractive power;
    wherein the following conditions are fulfilled:

$$0.5\Phi < -\Phi f < 0.7\Phi \tag{1};$$
    $$0.55\Phi < \Phi r < 0.87\Phi \tag{2};$$
    $$1.55\ (1/\Phi) < d < 1.98\ (1/\Phi) \tag{3};$$
    and
    $$dr < 2.1\ (1/\Phi) \tag{4};$$

wherein:
Φ: is the overall refractive power for the overall optical system for infrared radiation;
Φf: is the refractive power for the first lens group;
Φr: is the refractive power for the second lens group;
d: is the distance between principal points of the first and second lens groups; and
dr: is the lens separation between the most objectwise lens surface and the most imagewise lens surface in the second lens group.

6. The optical system of claim 5, wherein said first and said second lens groups comprise three lenses composed of a material selected from the group consisting of silicon, germanium or mixtures thereof.

7. The optical system of claim 5, wherein said negative meniscus lens in said first lens group is made of silicon and wherein said first sub-lens group in said second lens group and said third sub-lens group in said second lens group comprise lenses composed of silicon.

8. The optical system of claim 7 wherein said second sub-lens group in said second group comprise a lens composed of germanium.

9. The optical system of claim 5, wherein said first lens group comprises a lens; and
    each of said first and said third sub-lens groups in said second lens group comprise a lens.

10. The optical system of claim 5, wherein an aperture stop is arranged between said first sub-lens group and said second sub-lens group in said second lens group.

11. An optical system for use in an infrared camera substantially consisting of:
- a first lens group having a negative refractive power consisting of a negative meniscus lens having a convex surface facing the object side;
- a second lens group having a positive refractive power located between said first lens group and an image plane of the system with said second lens group consisting of, in order from the object side:
- a first lens having a positive refractive power;
- a second lens having a negative refractive power; and
- a third lens having a positive refractive power;

wherein said system satisfies the following conditions:

$$0.5\Phi < -\Phi f < 0.7\Phi \quad (1);$$

$$0.55\Phi < \Phi r < 0.87\Phi \quad (2);$$

$$1.55\,(1/\Phi) < d < 1.98\,(1/\Phi) \quad (3);$$

and $$dr < 2.1\,(1/\Phi) \quad (4);$$

where:
$\Phi$: is the overall refractive power for the optical system for infrared radiation;
$\Phi f$: is the refractive power for the first lens group;
$\Phi r$: is the refractive power for the second lens group;
d: is the distance between principal points of the first and second lens groups; and
dr: is the lens separation between the most objectwise lens surface and the most imagewise lens surface in the second lens group.

12. The optical system of claim 11, wherein said negative meniscus lens, said first lens, said second lens and said third lens consist of materials selected from the group consisting of silicon and germanium.

\* \* \* \* \*

UNITED STATES PATENT AND TRADEMARK OFFICE
CERTIFICATE OF CORRECTION

PATENT NO. : 5,909,307
DATED : June 1, 1999
INVENTOR(S) : Motoo KOYAMA

It is certified that error appears in the above-identified patent and that said Letters Patent is hereby corrected as shown below:

```
Title page, after item [22], the following should be inserted:
-- [30] Foreign Application Priority Data:
             Nov. 13, 1996 [JP].................... 8-302230 --.
```

Signed and Sealed this

Fifth Day of September, 2000

Attest:

Q. TODD DICKINSON

Attesting Officer     Director of Patents and Trademarks